Jan. 14, 1936. J. MORAN 2,028,001
CULTIVATING TOOL
Filed July 10, 1935
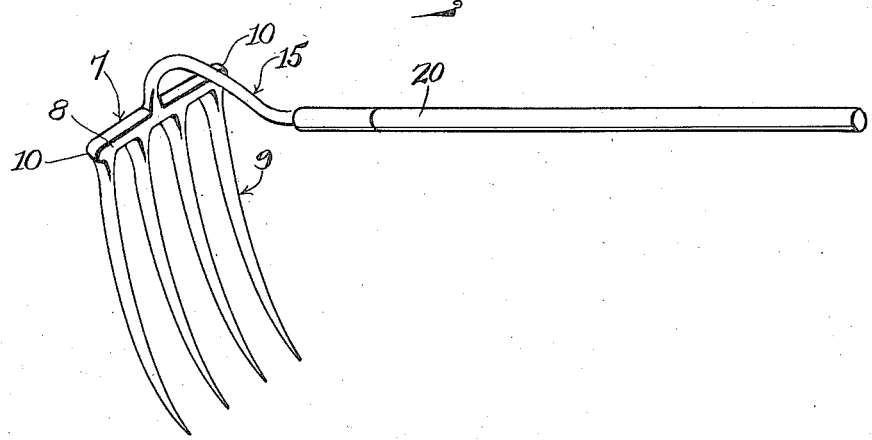
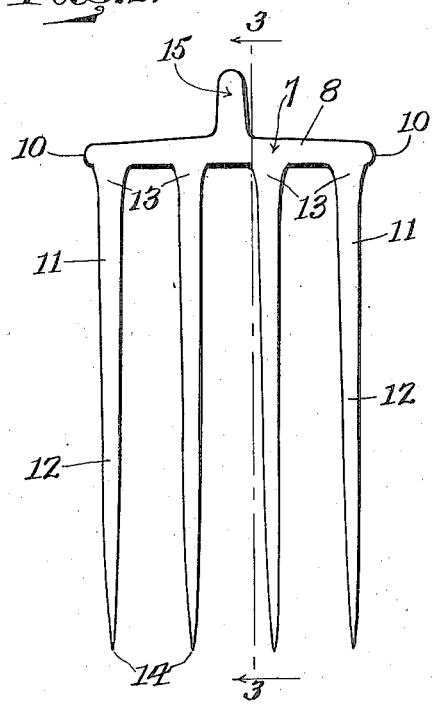
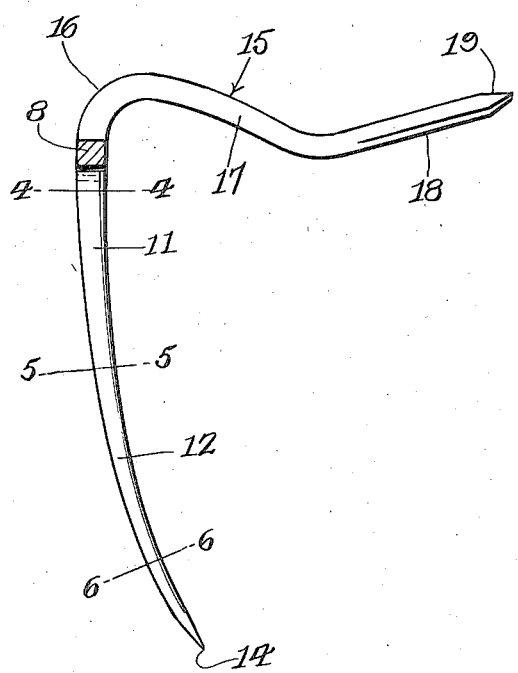
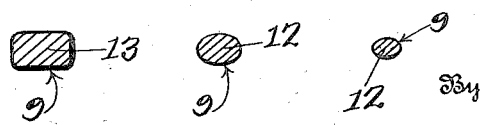
Inventor
John Moran
By Geo. P. Kimmel
Attorney Patented Jan. 14, 1936

2,028,001

UNITED STATES PATENT OFFICE 2,028,001

CULTIVATING TOOL

John Moran, Long Island, N. Y.

Application July 10, 1935, Serial No. 30,720

1 Claim. (Cl. 97—63)

This invention relates to a cultivating tool for gardens and has for its object to provide, in a manner as hereinafter set forth, a tool of the class referred to for enabling a person to work around and over small flowers without injuring them.

A further object of the invention is to provide, in a manner as hereinafter set forth, a tool of the class referred to including a fork-like blade having elongated spaced sharp tines of a shape to enable a person to work around and over small plants without injuring them.

Further objects of the invention are to provide, in a manner as hereinafter set forth, a garden tool which is simple in its construction and arrangement, strong, durable, compact, thoroughly efficient in its use and inexpensive to manufacture.

With the foregoing and other objects which may hereinafter appear, the invention consists of the novel construction, combination and arrangement of parts as will be more specifically described and as are illustrated in the accompanying drawing wherein is shown the preferred embodiment of the invention, but it is to be understood that changes, variations and modifications may be resorted to which fall within the scope of the invention as claimed.

In the drawing:

Figure 1 is a perspective view of the tool,

Figure 2 is a front elevation thereof,

Figure 3 is a section on line 3—3, Figure 2, and

Figures 4, 5, and 6 are respectively sections on lines 4—4, 5—5, and 6—6, Figure 3.

The tool includes a fork-like blade 7 formed of a body part or cross head 8 of square cross section and a set of equally spaced parallel tines 9 integral at their upper ends with the lower face of the body part 8. The outer tines of the set are arranged inwardly adjacent to the ends 10. The front and back of the tines are flush with the front and rear faces of the body part 8. Each tine 9 is so formed as to have the part 11 of its length to align with and the remaining part 12 of its length to project rearwardly with respect to body part 8. The part 12 is of materially greater length than part 11. The tines 9 are of like construction and the description of one will apply to the others.

Each tine is of greater length than that of body part 8 and has its upper terminal portion 13 of flared contour. The flare is at the sides of the tine. The front and back of the tine are respectively upon irregular convex and concave curves to form the tine of gradually decreasing cross sectional area from its upper end to its lower end and to provide the tine with a pointed lower end 14. The flared terminal portion 13 of the tine is of rectangular contour. The part 11 of the tine from portion 13 to part 12 is substantially of oval contour in cross section. The part 12 of the tine from part 11 to point 14 is substantially of oval contour in cross section. The curvature of the front and back of the tine provides for the part 11 to align with body part 8 and for the part 12 to be upon a rearwardly directed curve.

The tool includes a rearwardly directed shank 15 formed of an upstanding rearwardly curved forward end part 16 which, at its lower end, merges into the upper face of body part 8 at the transverse center of the latter, a downwardly disposed rearwardly directed intermediate part 17 of compound curvature merging at its upper end into the upper end of part 16 and an upwardly inclined rearwardly directed rear end part 18 merging at its forward end into the rear end of part 17. The part 18 is of square cross section and has its rear end 19 pointed. A handle 20 is secured upon the rear end of part 18.

What I claim is:

In a cultivating tool, a cross head of square cross section having squared front, bottom, top and rear faces, a set of equally spaced pointed tines integral at their upper ends with the lower face and flush with the front and rear faces of the cross head, the outer tines of said set being arranged inwardly adjacent to the ends of said cross head, said tines extending rearwardly with respect to said cross head and having the front and back thereof respectively upon irregular convex and concave curves whereby the body of the tines will gradually decrease in cross sectional area from their upper to their lower ends, said tines having their upper terminal portions laterally flared sidewise in a direction lengthwise with respect to the lower face of the cross head and of rectangular contour in cross section, said tines having their remaining portions of substantially oval contour in cross section gradually decreasing in width and breadth to their lower ends, and a handle connecting shank including an upstanding rearwardly directed curved forward end part terminating in a downwardly extending rearwardly directed part of compound curvature merging into a rearwardly directed upwardly inclined squared portion having a pointed end, the lower end of said forward end part being integral with the top of the cross head at the transverse center of the latter.

JOHN MORAN.